(12) United States Patent  
Lenard

(10) Patent No.: US 12,424,341 B2
(45) Date of Patent: Sep. 23, 2025

(54) NUCLEAR COMPONENT TESTING

(71) Applicant: Roger X Lenard, Edgewood, NM (US)

(72) Inventor: Roger X Lenard, Edgewood, NM (US)

( * ) Notice: Subject to any disclaimer, the term of this patent is extended or adjusted under 35 U.S.C. 154(b) by 199 days.

(21) Appl. No.: 18/217,869

(22) Filed: Jul. 3, 2023

(65) Prior Publication Data

US 2025/0149195 A1    May 8, 2025

(51) Int. Cl.
*G21C 17/00* (2006.01)
*G21C 17/028* (2006.01)
*G21C 17/06* (2006.01)
*G21C 17/112* (2006.01)

(52) U.S. Cl.
CPC ........... *G21C 17/00* (2013.01); *G21C 17/028* (2013.01); *G21C 17/06* (2013.01); *G21C 17/112* (2013.01)

(58) Field of Classification Search
CPC ...... G21C 17/06; G21C 17/10; G21C 17/112; G21C 17/028
See application file for complete search history.

(56) References Cited

U.S. PATENT DOCUMENTS

| | | | | | |
|---|---|---|---|---|---|
| 3,111,477 | A | * | 11/1963 | Bean | G21C 1/12 376/427 |
| 4,863,675 | A | * | 9/1989 | Yampolsky | G21D 1/00 376/905 |
| 5,084,229 | A | * | 1/1992 | Welsh | G21C 17/06 376/256 |
| 6,697,446 | B2 | * | 2/2004 | Kang | G21C 1/303 376/202 |
| 2007/0201608 | A1 | * | 8/2007 | Model | G01N 17/02 376/417 |
| 2015/0155060 | A1 | * | 6/2015 | Yetisir | G21C 1/20 376/361 |
| 2018/0322970 | A1 | * | 11/2018 | Singh | G21F 5/008 |

FOREIGN PATENT DOCUMENTS

RU    2680721 C1 * 2/2019

OTHER PUBLICATIONS

Steiner, Tyler R., Emily N. Hutchins, and Richard H. Howard. "Steady-State In-Pile Nuclear Thermal Propulsion Experimental Testbed Initial Demonstration at the Ohio State University Research Reactor." Nuclear Technology 208.1 (2022): 100-114.*
Olsen, Charles S., et al. "Hydrogen loops in existing reactors for testing fuel elements for nuclear propulsion." AIP Conference Proceedings. vol. 271. No. 2. American Institute of Physics, 1993.*
Howard, Richard. "Design of the In-pile experiment Set (INSET) apparatus to support Nuclear Thermal Propulsion fuel and component testing". Oak Ridge National Laboratory (ORNL), Oak Ridge, TN (United States), 2020. Nuclear and Emerging Technologies for Space. Knoxville, TN, Apr. 6-Apr. 9, 2020, available onl.*

(Continued)

Primary Examiner — Herbert K Roberts
(74) Attorney, Agent, or Firm — Outer Space IP

(57) ABSTRACT

Devices and systems for testing nuclear components are disclosed. An outer shell and inner shell containing a nuclear test component are fed with a test gas which is heated by nuclear reactions. A second gas is fed into the gas outlet to cool the test gas.

10 Claims, 5 Drawing Sheets

(56) References Cited

OTHER PUBLICATIONS

Howard, Richard, "A High Temperature Out-Of-Pile Experiment for Testing Nuclear Thermal Propulsion Surrogate Fuels." PhD diss., University of Tennessee, 2019. https://trace.tennessee.edu/utk_graddiss/5946.*

Emrich Jr, William J., and Michael P. Schoenfeld. "Lessons learned from recent testing in the nuclear thermal rocket element environmental simulator". ANS NETS 2018—Nuclear and Emerging Technologies for Space. No. M17-6436. 2018.*

Emrich Jr, William J. "Nuclear thermal rocket element environmental simulator (ntrees)." AIP Conference Proceedings. vol. 969. No. 1. American Institute of Physics, 2008.*

\* cited by examiner

SECTION A-A

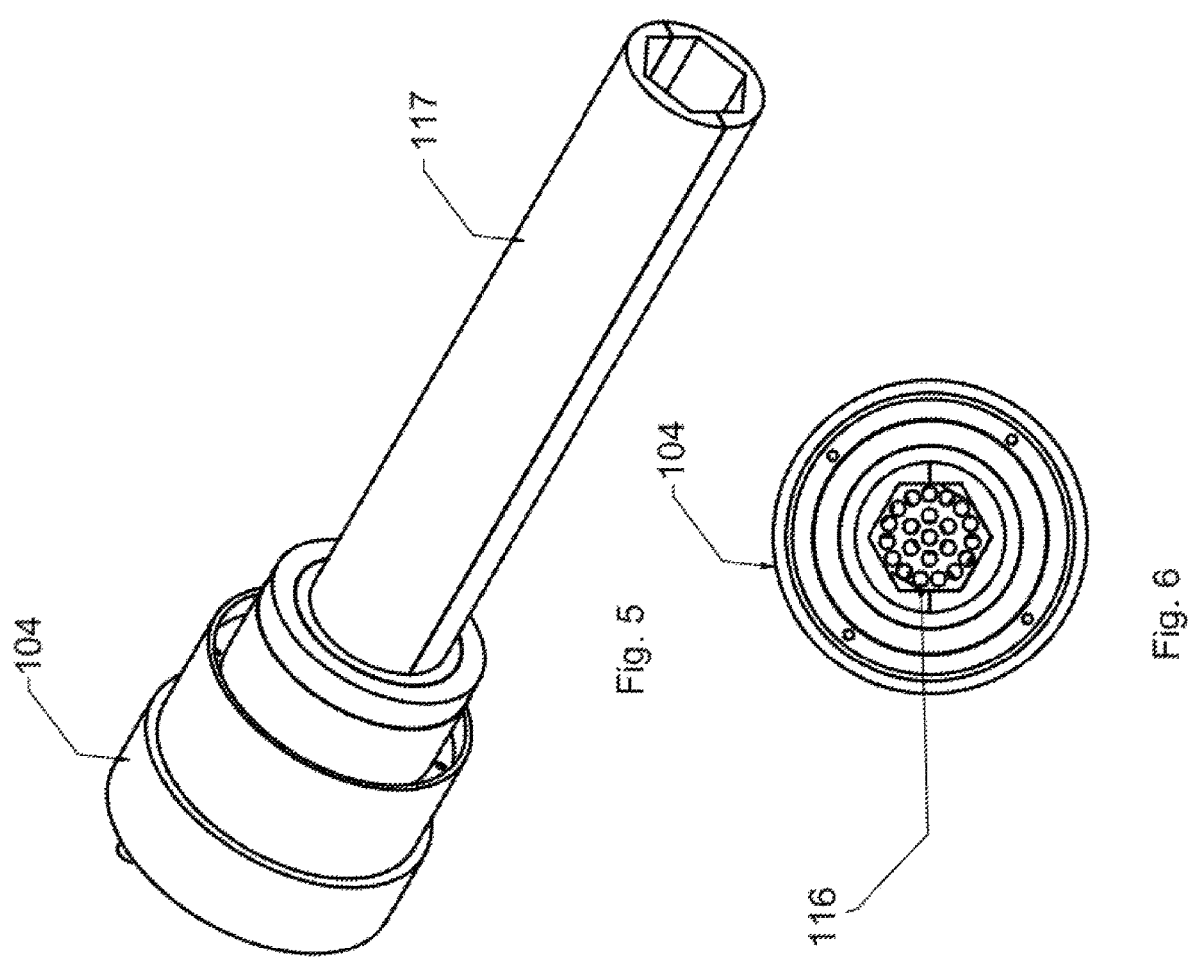

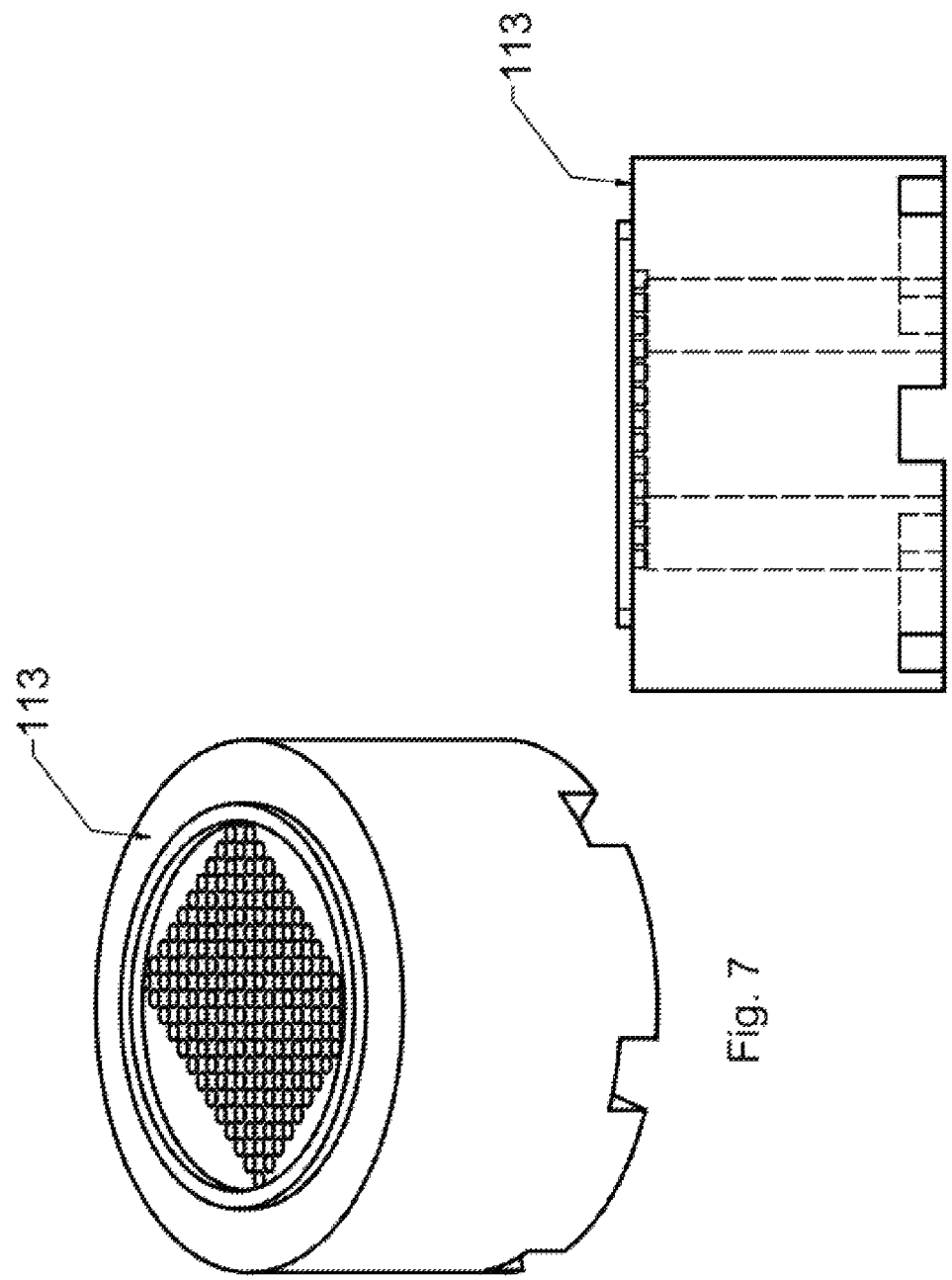

NUCLEAR COMPONENT TESTING

TECHNICAL FIELD

This disclosure relates generally to nuclear component testing.

BACKGROUND

Nuclear Thermal Propulsion (NTP) fuel and fuel component testing is inhibited by the lack of suitable facilities. There are no available facilities which can test NTP fuel or components to time (several hours) at temperature (>2700 Kelvins) or approaching NTP power densities. Many facilities do not allow for testing in a hydrogen environment, much less a flowing or circulating hydrogen environment. Fewer still can allow testing with flowing hydrogen at typical operating pressures, (~1000 psi). [2] Nuclear Thermal Propulsion (NTP) fuel and fuel component testing is inhibited by the lack of suitable facilities. There are no available facilities which can test NTP fuel or components to time (several hours) at temperature (>2700 Kelvins) or approaching NTP power densities. Many facilities do not allow for testing in a hydrogen environment, much less a flowing or circulating hydrogen environment. Fewer still can allow testing with flowing hydrogen at typical operating pressures, (~1000 psi). Nuclear component testing is also limited by the configurations of the reactor facilities' test ports. Improved nuclear NTP component testing is needed to advance nuclear thermal propulsion component testing.

SUMMARY

In a first aspect, the disclosure provides a device for testing nuclear components. An outer shell is shaped to fit in a nuclear reactor test port. An inner shell is enclosed in the outer shell with a plenum between the inner shell and the outer shell. A first gas inlet passes through the outer shell and feeds a test gas into the plenum. Passage through the plenum warms the test gas, thereby cooling the inner shell and the outer shell. An inner gas inlet feeds the test gas from the plenum into the inner shell and across a nuclear component. A gas outlet draws the test gas away from the nuclear component and out of the outer shell. A second gas inlet passes through the outer shell and feeds a second gas into the gas outlet, mixing the test gas with the second gas, thereby cooling the test gas.

In a second aspect, the disclosure provides a system for testing nuclear components. An outer shell is shaped to fit in a nuclear reactor test port. An inner shell is enclosed in the outer shell with a plenum between the inner shell and the outer shell. The inner shell is configured to house a nuclear component. A first gas inlet passes through the outer shell and is configured to feed a test gas into the plenum. Passage through the plenum warms the test gas, thereby cooling the inner shell and the outer shell. An inner gas inlet is configured to feed the test gas from the plenum into the inner shell and across a nuclear component. The nuclear component is configured to heat the test gas. A gas outlet is configured to draw the test gas away from the nuclear component and out of the outer shell. A second gas inlet passes through the outer shell and is configured to feed a second gas into the gas outlet, mixing the test gas with the second gas, thereby cooling the test gas.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 5 is an isometric view of an insert for the test capsule of FIG. 1.

FIG. 6 is an end view of the insert of FIG. 5.

FIG. 7 is an isometric view of a plenum for the test capsule of FIG. 1.

FIG. 8 a side view of the plenum of FIG. 7.

DETAILED DESCRIPTION

Figure 1:
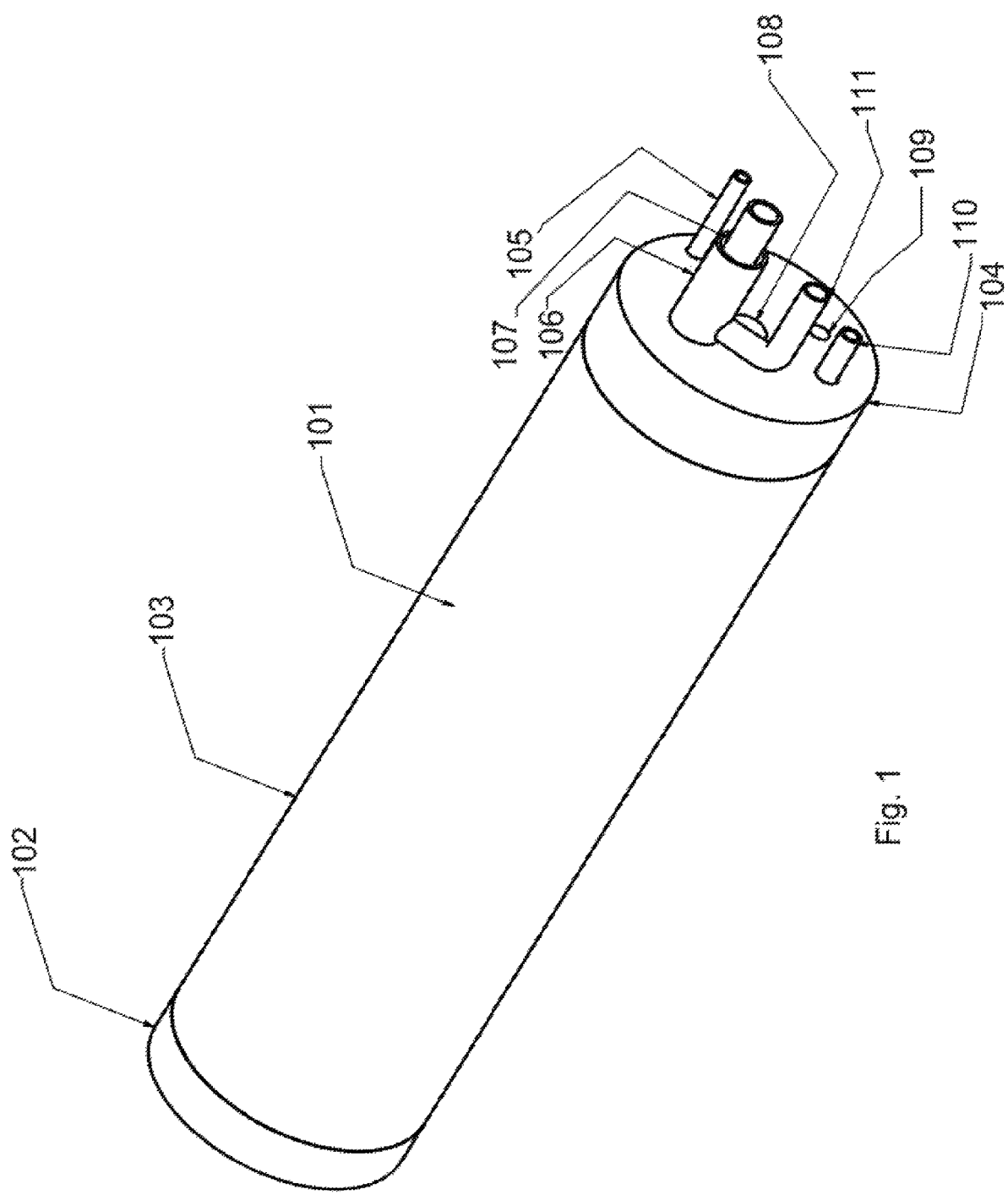
FIG. 1 is an isometric view of a test capsule for nuclear component testing.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

In one embodiment of the present invention, an externally-fed and cooled instrumented Fuel Test Capsule (FTC) with the ability to be configured to accept a wide range of nuclear fuel components which enables testing in the 3GV6 (or similarly configured) test port in the MIT Reactor Facility is disclosed. The FTC can test nuclear fuel components in a variety of test conditions, with different test atmospheric constituents, with gas test temperatures up to 2700 Kelvins, with the potential for higher temperatures. Other embodiments of the present invention include testing in any 3GV test port, or other test ports, would be clear as an extension to someone of normal skill in the art.

The 3GV6 test port is in the reflector/reactor region of the MIT reactor. The FTC of the present invention is able to be put in and out of the test port while the reactor is running. The tests can last minutes, hours, days, or even a full reactor test run of 66 days. In essence, this can be a 'dipstick' type operation. Because of the layout of the FTC, temperatures of greater than 2700 K can be achieved. The use of substantial volumes of facility gas allows for irradiation of gas at high temperatures. The test component inside the FTC can take any shape of fuel element, such as round, square, hexagonal, particles, or stacks of disks. The test can be changed mid run by changing the FTC halves without changing the whole test capsule.

The present invention enables testing of nuclear components at high temperatures and pressures in a flowing hydrogen environment.

Figure 2:
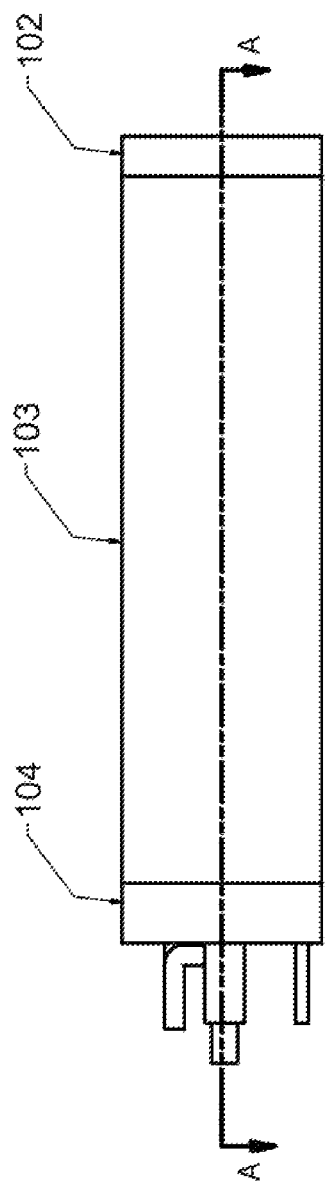
FIG. 2 is a first side view of the test capsule of FIG. 1.
Figure 3:
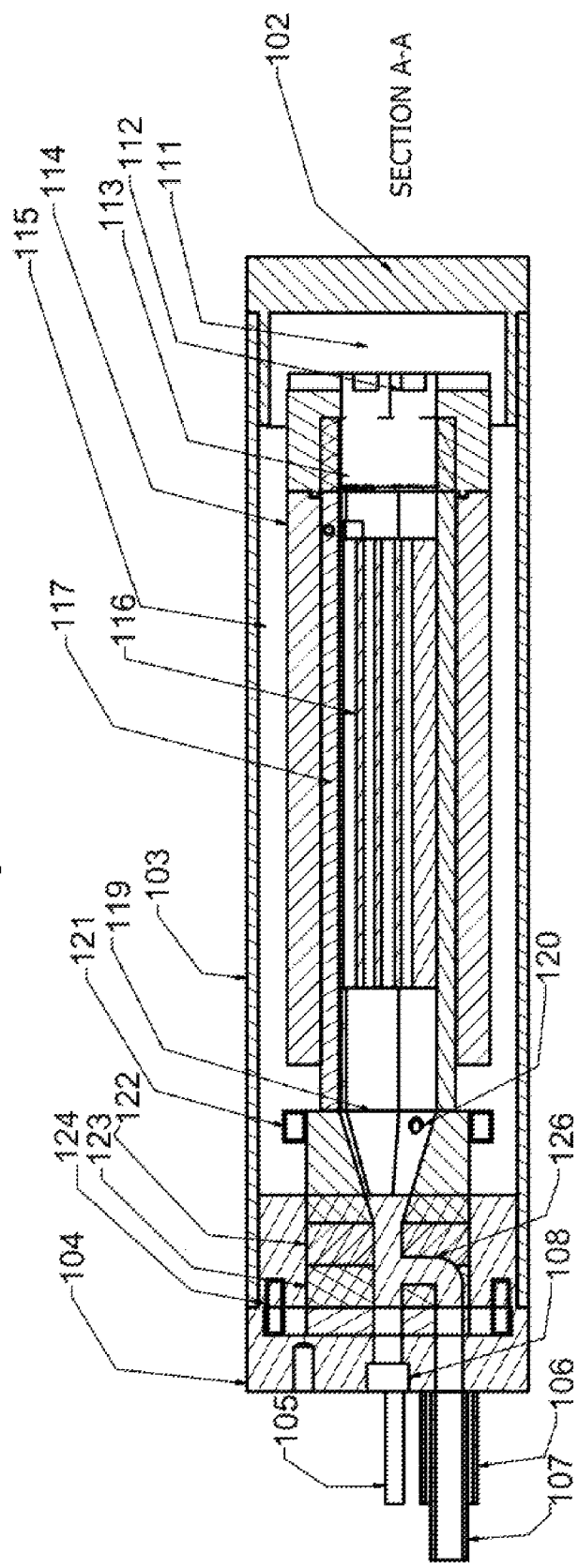
FIG. 3 is a cross-sectional view of the test capsule of FIG. 1.
Figure 4:
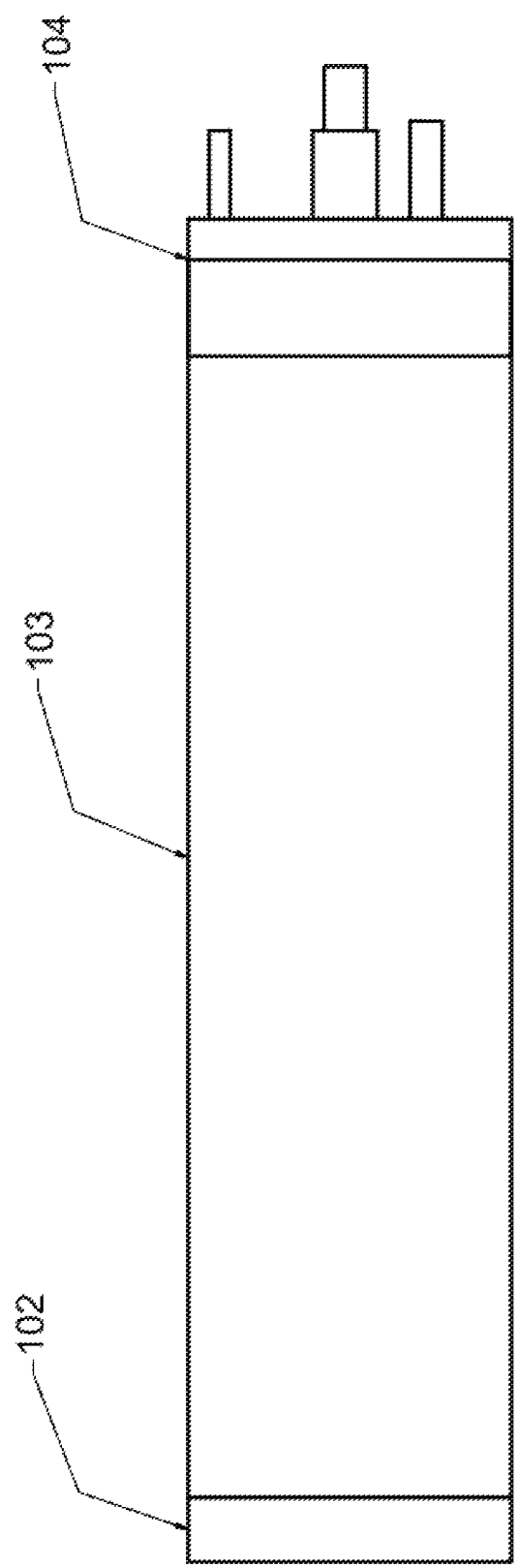
FIG. 4 is a second side view of the test capsule of FIG. 1.

FIG. 1 is an isometric view of a test capsule for nuclear component testing that may be used in one embodiment of the present invention. FIG. 2 is a first side view of the test capsule of FIG. 1. FIG. 3 is a cross-sectional view of the test capsule of FIG. 1. FIG. 4 is a second side view of the test capsule of FIG. 1. FIG. 5 is an isometric view of an insert for the test capsule of FIG. 1. FIG. 6 is an end view of the insert of FIG. 5. FIG. 7 is an isometric view of a plenum for the test capsule of FIG. 1. FIG. 8 a side view of the plenum of FIG. 7.

A fuel test capsule (FTC) 101 consists of internals and externals. The externals consist of a containment outer structure with a bottom cap 102, an outer containment 103, and a top cap 104, configured to enclose a fuel test structure and fit inside a nuclear reactor test port. After the FTC 101 is loaded with a fuel component and all other internals, the bottom cap 102, outer containment 103, and the top cap 104, may be welded together. The top cap 104 consists of a number of gas and instrumentation connections, detailed further herein.

A gas feed inlet 110 connects inside the FTC 101 to a first gas manifold 124 that distributes the test feed gas through an outer gas plenum 115 between the outer containment wall 103 and annular insulation 114. The test feed gas then passes through lower inlet ports 112 into a lower gas plenum 113. From the lower gas plenum 113, the test gas passes across the nuclear test component 116 where it is heated by the nuclear fission process and continues on into a gas diffuser 119. The test gas continues from the diffuser 119 to leave the FTC 101 through exit port 107. Exit port 107 is jacketed by line 106, through which a cooling fluid is passed to help cool the exiting test gas in exit port 107. Before the test port 107 exits, the line jogs 126 inside of a diverter puck 122, 123. A sapphire window 108 is in line with the nuclear test component 116 and the gas diffuser 119 and is used as a fiber optic observation port to measure temperature.

A second gas inlet port 110 provides a cooling gas for delivery through second gas manifold 121, through the ports 120 in the diffuser 119, providing cooling of the test gas in the diffuser by mixing with the cooling gas.

A lower insulator 111 prevents substantial thermal energy from being transferred from the capsule internals to the 3GV6 test port. The nuclear test component is surrounded by a fuel test chamber 117. The annular insulator 114 surrounds the fuel test chamber 117 and is used to regulate heat from the nuclear test component 116 to the outer gas plenum 115.

An instrument port 109 is available to pass instruments or instrument leads into the FTC 101.

The feed rate of the test gas and the cooling gas are both controllable. Further, as the 3GV6 test port feeds into the reactor's reflector/moderator, the thermal neutron flux is constant and nearly isotropic. To increase the gas temperatures at the exit point 119, the test gas flow rate may be decreased. To decrease the gas temperature, the test gas flow rate may be increased. The cooling gas acts as a tuning parameter for finely controlling the temperature of the exiting test gas at 107.

In some embodiments, additional elements are inserted into the 3GV6 test port, such as a neutron filter to decrease the flux of neutrons to the test capsule. This allows a test sample to be tested at various power levels without changing the fuel test sample itself.

In the 3GV6 embodiment, the FTC 101 would be approximately 2.5 inches in outer diameter. In other test ports, the size would be adjusted to match the test port size.

In some embodiments, the test gas is hydrogen. In some embodiments, the cooling gas is hydrogen.

The invention has been described with reference to various specific and preferred embodiments and techniques. Nevertheless, it is understood that many variations and modifications may be made while remaining within the spirit and scope of the invention.

What is claimed is:

1. A system for testing nuclear components comprising:
an outer shell shaped to fit in a nuclear reactor test port;
an inner shell enclosed in the outer shell with a plenum between the inner shell and the outer shell, the inner shell configured to house a nuclear component;
a first gas inlet passing through the outer shell and configured to feed a test gas into the plenum, wherein passage through the plenum is configured to warm the test gas, thereby cooling the inner shell and the outer shell;
an inner gas inlet configured to feed the test gas from the plenum into the inner shell and across a nuclear component;
the nuclear component configured to heat the test gas;
a gas outlet configured to draw the test gas away from the nuclear component and out of the outer shell; and
a second gas inlet passing through the outer shell and configured to feed a second gas into the gas outlet, mixing the test gas with the second gas, thereby cooling the test gas.

2. The invention of claim 1, further comprising a cooling line enclosing at least a portion of the gas outlet outside the outer shell and configured to cool the discharge line and the test gas exiting the outer shell.

3. The invention of claim 1, further comprising a fiber optics port in the outer shell configured to provide a fiber optic detector a view port to observe the gas outlet and nuclear component.

4. The invention of claim 1, further comprising an instrumentation port in the outer shell configured for instruments, instrument signal lines, or both to pass into the inner shell.

5. The invention of claim 1, further comprising a first gas manifold between the first gas inlet and the plenum, the first gas manifold configured to receive the test gas and distribute the test gas into the plenum.

6. The invention of claim 1, wherein the gas outlet adjacent the nuclear component comprises a diffuser, and further comprising a second gas manifold between the second gas inlet and the gas outlet, the second gas manifold configured to receive the second gas and distribute the second gas through the diffuser into the gas outlet.

7. The invention of claim 1, wherein the inner shell comprises insulation between the nuclear component and the outer shell configured to minimize heat transfer out of the inner shell.

8. The invention of claim 1, wherein the nuclear reactor test port comprises a 3GV6 test port.

9. The invention of claim 1, wherein the device is configured to feed the test gas at a rate that maintains a desired temperature in the nuclear component.

10. The invention of claim 1, wherein the device is configured to feed the second gas at a rate that maintains a desired temperature in the gas outlet.

* * * * *